United States Patent [19]

Dalibout et al.

[11] Patent Number: 4,703,623
[45] Date of Patent: Nov. 3, 1987

[54] DOUBLE-PISTON MASTER CYLINDER WITH CENTRAL BOOSTER-DRIVEN PISTON DRIVING SURROUNDING LOW PRESSURE PISTON

[75] Inventors: Georges Dalibout, Gagny; Michel Grenier, Dampmart; Daniel Cieplinski, Villemomble, all of France

[73] Assignee: WABCO Westinghouse Equipements Ferroviaires S.A., Freinville-Sevran, France

[21] Appl. No.: 786,916

[22] Filed: Oct. 11, 1985

[51] Int. Cl.⁴ .......................... B60T 11/08; F15B 7/04
[52] U.S. Cl. ........................................ 60/577; 60/584; 60/589; 60/591; 60/593
[58] Field of Search ............... 60/547.1, 562, 574, 60/575, 576, 577, 578, 589, 591, 593, 584; 92/241

[56] References Cited

U.S. PATENT DOCUMENTS

| | | | |
|---|---|---|---|
| 2,206,629 | 7/1940 | Bowen | 60/576 X |
| 2,291,056 | 7/1942 | Pallady | 60/578 |
| 2,373,506 | 4/1945 | Schnell | 60/576 |
| 3,062,011 | 11/1962 | Brooks | 60/576 X |
| 3,981,148 | 9/1976 | McLuckie | 60/574 |
| 4,099,380 | 7/1978 | Cadeddu | 60/589 X |
| 4,319,457 | 3/1982 | Gross et al. | 60/593 |
| 4,467,605 | 8/1984 | Smith | 60/577 |

FOREIGN PATENT DOCUMENTS

| | | | |
|---|---|---|---|
| 55-112405 | 8/1980 | Japan | 60/574 |
| 532980 | 2/1941 | United Kingdom | 60/591 |
| 1059880 | 2/1967 | United Kingdom . | |

Primary Examiner—Robert E. Garrett
Assistant Examiner—George Kapsalas
Attorney, Agent, or Firm—G. E. Hawranko

[57] ABSTRACT

A dual-piston hydraulic brake master cylinder includes a large hydraulic piston which supplies an initial large brake fluid volume and a small hydraulic piston which continues to supply brake fluid to the brakes when the large piston stops moving forward in its cylinder at higher brake pressures. The small, central hydraulic piston is connected to the end of a piston rod extension of a pneumatic booster piston. The large piston surrounds the small piston and opens a reservoir line tilt-valve in the piston retracted position. A passageway between the large and small hydraulic chambers is open in the retracted position to allow communication of braking fluid therebetween. During brake actuation a seal arrangement interrupts this communication. The large and small hydraulic chambers supply the brake circuits through delivery passages.

19 Claims, 2 Drawing Figures

DOUBLE-PISTON MASTER CYLINDER WITH CENTRAL BOOSTER-DRIVEN PISTON DRIVING SURROUNDING LOW PRESSURE PISTON

BACKGROUND OF THE INVENTION

The present invention applies to a hydraulic pressure transmitter for at least one receiver mechanism, such as, a brake cylinder. The pressure transmitter can be of the type which consists of a small cross-section piston directly activated by a push rod to pressurize and reduce the volume of a small cross-section hydraulic chamber linked to the receiver mechanism; and a large cross-section piston activated parallel to the push rod by or via an elastic mechanism of transmission, such as, a calibrated spring, to pressurize and reduce the volume of a large cross-section hydraulic chamber also linked to the receiver mechanism. Such a hydraulic pressure transmitter, in order to function at the beginning of transmitter activation, delivers a large flow of hydraulic fluid by the large piston until the delivery pressure, acting on the large diameter piston, is able to oppose the action of the elastic mechanism of transmission.

Furthermore, such piston-type hydraulic pressure transmitters—commonly called "master cylinders" in the automotive industry—were proposed to allow the wear of the friction mechanism of the brakes to be automatically compensated so that the friction linings be rapidly brought into contact with their braking element through a large flow of low pressure braking fluid, and that the application of the brakes then continue at elevated hydraulic pressure after initial application of the friction linings. This method of brake control made it possible to insure application of the brakes in a braking system with relatively significant play between the friction lining and braking element.

These hydraulic pressure transmitters with double-braking pressure (initial application pressure and continued application pressure) were no longer used when reliable and efficient slack-adjusting regulators were available, and the use of disc brakes in the automotive industry made it possible to implement follower hydraulic systems which limited the application stroke of the friction linings. Typically, disc brake units use an elastic follower segment which prevents, by friction, any considerable reversing of the friction linings after applying the brakes; but allows, on the other hand, the forced reverse of these linings to proceed to their changing.

For certain hydraulic pressure-controlled, high-power disc brakes, as used, for instance, on heavy road vehicles or railroad vehicles (particularly those equipped with floating calibers), it is necessary to obtain rapid and complete disengagement of the brakes to authorize a reverse of the friction linings at disengagement such that considerable play (on the order of a millimeter, at least, for high-power disc brakes) is left between the friction linings and the braking elements. These brakes, which have high-temperature braking power, also require, upon application of the brakes, considerable elastic work which corresponds to the compression of the relatively thick friction linings and to the elastic extension of the calibers which hold the friction linings. These various requirements for activation of high-temperature power brakes, particularly the disc brakes of heavy road and railway vehicles, cannot be completely satisfied by the known systems of double-piston master cylinders. Actually, in these known systems, the leak-proof linings for large cross-section pistons cannot withstand the high pressures required for activation of the brakes. Furthermore, in the systems where the low pressure chamber is isolated from the high pressure chamber, the low pressures obtained by oil insufflation or by piston scraping are insufficient to insure application of the friction linings against power return springs used to achieve an inactive position.

It is a requirement, therefore, that such a hydraulic pressure transmitter transmit an initial large flow of hydraulic fluid at already significant pressure (between 2 and 10 bar), sufficient to overcome the loss of head of the hydraulic circuit to ensure rapid application of the friction linings to the braking discs by acting against these powerful return springs, which tend to return these linings to a disengaged position. The return springs must act under all friction conditions in order to guarantee rapid disengagement of the brakes. They are particularly indispensable to prevent locking of the braked wheels, i. e., blocking of these wheels or tendency to block during braking and before the stop of the braked vehicle.

SUMMARY OF THE INVENTION

It is, therefore, an object of the invention to provide a hydraulic pressure transmitter having a large cross-section hydraulic chamber which is linked permanently to the receiving mechanism through the intermediary of a check valve which opens in a direction of the receiving mechanism and on the other hand is in reverse position to a resupply hydraulic fluid source. Furthermore, the small cross-section hydraulic chamber is linked to the receiving mechanism by a circuit permitting the return of the hydraulic fluid, at least up to a minimal residual pressure. Also, the hydraulic pressure transmitter is provided with—in cooperation with the bore body or guide body of the small cross-section piston—means for establishing a connection between the hydraulic chambers having small and large cross-sections in reverse position of said small cross-section piston, as well as means for returning, after said establishment of connection, the large cross-section piston towards its reverse position and establishment of communication of the large cross-section hydraulic chamber with the fluid reservoir.

It is a further object of the invention to provide a hydraulic pressure transmitter, wherein the main source return of the large cross-section piston towards its reverse position is preferably made up of, at times, a mechanical-return mechanism, such as, a return spring, together with the small cross-section piston towards its reverse position; and at other times, an annular stop of the small cross-section piston, which acts as a support on the guide body in the reverse position of the small cross-section piston when the guide body of the small cross-section piston abuts the large cross-section piston.

It is yet another object of the invention that, according to a method of implementation which decreases the hysteresis of the hydraulic pressure transmitter, the guide body of the small cross-section piston is moveable in a sealed manner in a bore so as to constitute an annular separation piston between the large and small cross-section hydraulic chambers, and has an annular section which is sensitive to the pressure in the small cross-section chamber and which acts, in this way, on the large cross-section piston (integral, at least in translation with the guide body) against the elastic transmission mechanism, so that the rise of pressure in the small cross-section chamber causes an increase of the pressure-reaction exercised on the large cross-section piston.

It is a further object of the invention to obtain satisfactory efficiency and sufficient compactness for the hydraulic pressure transmitter whereby the annular section of the bore body, which is sensitive to pressure within the small cross-section chamber, is at least three times smaller than the cross-section of the small-cross section piston.

Yet a further object of the invention is to provide such a hydraulic pressure transmitter (according to a simplified method of implementation) wherein a check valve, which opens in the direction of the receiving mechanism, is likely to be brought (in its open position) in a reverse position of the large cross-section piston, so as to link the large cross-section hydraulic chamber to the receiving mechanism in this reverse position of the large cross-section piston. This disposition makes it possible to remove all the valves of the small cross-section piston-cylinder, which generally work at high pressures, and thereby improving reliability. The large cross-section piston cylinder arrangement can thus consist of a plunger piston engaged on a lipped annular O-ring of which at least one lip is plated on the polished, cylindrical surface of the plunger piston by action of the pressure in the small cross-section hydraulic chamber. The plunger piston is also integral(at its end) in the small cross-section hydraulic chamber with a stop plate, or ring stop, which is capable of coming up against a guide body stop in front of the lipped O-ring and inside the small cross-section chamber, so as to allow the return of the guide body and of the large cross-section piston (which is linked to it) by the plunger piston when the latter is returned to the extreme reverse position. Such a master cylinder requires only exterior straightening of the rod of the plunger piston (which is capable of considerable stroke) and, in that case, presents exceptional reliability and aptitude for high-pressure application.

It is a further object of the invention (according to an alternate embodiment) to have a small cross-section piston which consists of a lipped O-ring (movable in a sealed manner) and a bore made in the glide body which, in the reverse position of the small cross-section piston, clears a resupply passage thus linking the large cross-section hydraulic chamber to the small cross-section hydraulic chamber; and an annular collar (located behind the lipped O-ring), in relation to the small cross-section hydraulic chamber, and which is likely to come up against an annular stop set at the bottom of the bore around the transmitter-activation push rod, so as to authorize the return of the guide body and of the large cross-section piston, which is linked to it only when the small cross-section piston (returned in reverse position) has cleared the resupply passage to allow it to link the large and small cross-section hydraulic chambers.

It is an even further object of the invention to obtain a very compact hydraulic pressure transmitter, capable of transmitting large volumes of hydraulic fluid for play-compensation or friction-lining approach of the braking discs.

According to still another method of implementation of the invention, which makes it possible to decrease even more the space occupied by the hydraulic pressure transmitter and to increase its reliability and the delivery pressures, the piston cylinder ensemble of this section consists of a plunger piston, whose reduced-thickness end is arranged in extreme reverse position within proximity of a lipped O-ring, which forms a cylinder while clearing an annular communication passage between the large and small hydraulic chambers and which, after a slight forward-stroke, comes into sliding contact by a lip with the O-ring, to isolate the small cross-section hydraulic chamber and make it possible for the exterior surface of the plunger piston to slide while maintaining sealed contact with the O-ring, as a result of placing the lip of the O-ring on the exterior surface of the plunger piston under the action of the pressure existing in the small cross-section hydraulic chamber. The plunger piston is integral with, at its end, in the small cross-section hydraulic chamber, a plate or stop disc, likely to come up against an annular stop placed inside the guide body in front of the lipped O-ring in the small cross-section hydraulic chamber, so as to bring back the guide body and the large cross-section hydraulic piston (which is linked to it) when the plunger piston is brought back into extreme reverse position and clears the communication passage between the small and large cross-section hydraulic chambers. The guide body, which isolates the large and small cross-section hydraulic chambers, is composed of a part of annular section which, on the one hand, cooperates over the entire stroke of the large annular piston with at least one isolation O-ring between the large and small cross-section hydraulic chambers; and which, on the other hand, circles the displacement path of the plunger piston over a length which is less than the maximum possible stroke of the plunger piston.

An even further object of the invention is to provide a simple, compact hydraulic pressure transmitter having a check valve which opens from the large cross-section hydraulic chamber towards the receiving mechanism, an overcharge valve which prevents overpressurization within the brake actuator.

Still another object of the invention is to provide a hydraulic pressure transmitter having a transmission elastic mechanism which activates the large annular piston and is composed of an annular piston subjected to activation fluid pressure of the push rod and guided in a sealed manner on the activation rod of the small cross-section piston.

According to a characteristic of the hydraulic pressure transmitter, the circuit, which links the small cross-section hydraulic chamber to the receiving mechanism, consists of a means for load-loss; such as, a throttle, sized in such a way that for a similar axial delivery speed of the large and small annular pistons, the loss of load or the pressure-drop of the delivery circuit of the small cross-section hydraulic chamber is greater than that of the circuit for the large cross-section hydraulic chamber in order to facilitate the initial delivery of the hydraulic fluid by the large annular piston. This arrangement of the invention ensures that, in the case of abnormal friction or braking on the large annular piston, the piston can still be activated at same time as the small annular piston, which ensures final hydraulic pressure. Actually, for similar axial displacement speed of the large and small annular pistons, the dynamic counterpressure caused by hydraulic fluid delivery is larger in the small cross-section hydraulic chamber than in the large cross-section hydraulic chamber. This arrangement, which might run the risk of delaying the disengagement of the brakes activated by the hydraulic pressure transmitter, is acceptable in a hydraulic braking circuit where the disengagement of the brakes is obtained after the removal of a very small quantity of hydraulic fluid (that which is required for pressurization of the hydraulic circuit) while large quantities of hydraulic fluid are required to ensure the application of the friction linings on the braking discs of the brakes

BRIEF DESCRIPTION OF THE DRAWINGS

Other objectives, advantages, and characteristics of the invention will become obvious upon reading of the description, in which.

DESCRIPTION AND OPERATION

Figure 1:
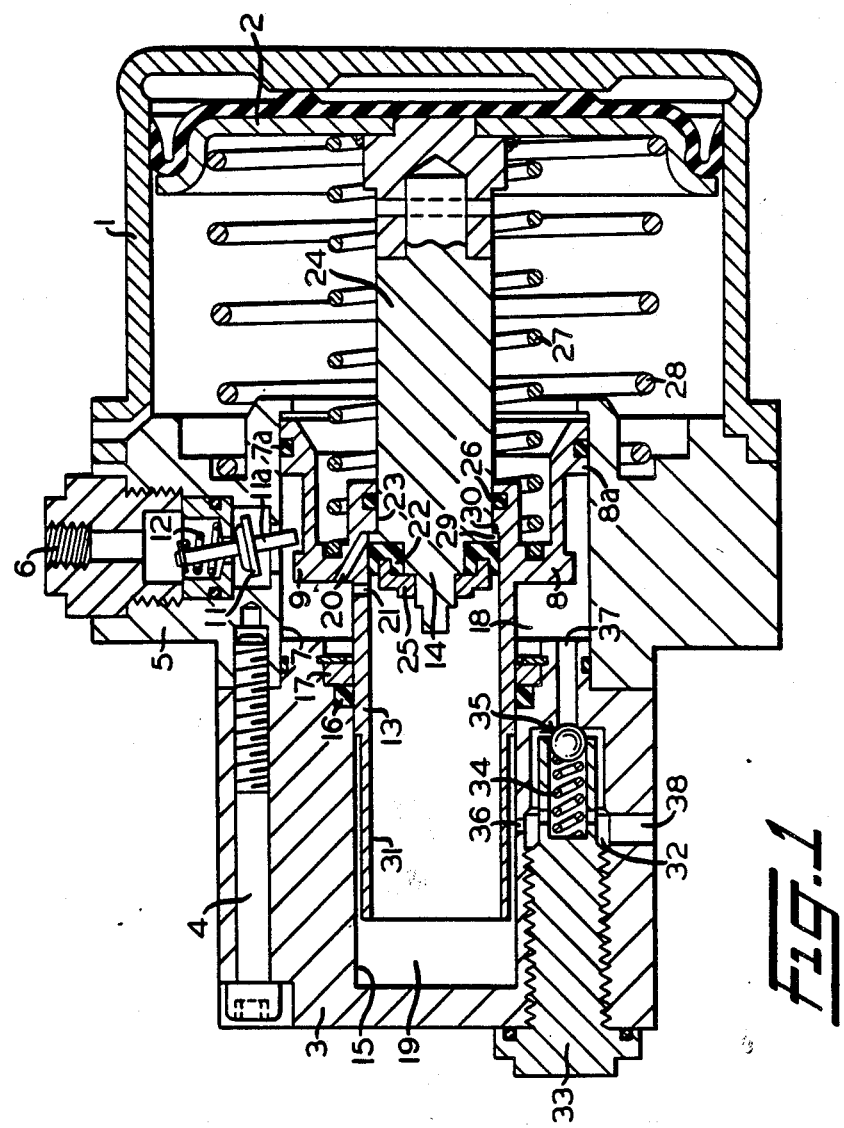
FIG. 1 is a longitudinal view, in section, of a hydraulic pressure transmitter constructed in accordance with the invention.

The hydraulic pressure transmitter, which is shown in cross-sectional view in FIG. 1, consists of three main housing components: a pneumatic control portion 1 in which a pneumatic piston 2 is movable, a hydraulic transmitter portion 3 connected by screws 4 to an intermediate portion 5, which also supports the pneumatic control cylinder 1 and is connected by a hydraulic connection 6 to a source of hydraulic fluid such as a tank of brake oil (not shown). In the intermediate portion 5, there is a bore 7, in which is movable, in a sealed manner due to a first O-ring 7a, a large annular piston 8 having a large cross-sectional surface and provided with an edge collar 9; which can operate, in the reverse or rightmost position (as shown in FIG. 1), a first check valve 11, interposed on the circuit of the hydraulic connection 6, to an open position against a first valve spring 12 which is used for check valve return to the closed position.

According to the invention, the large annular piston 8 has extending integrally therefrom, a bore body or piston extension 13 for a small hydraulic piston 14. The piston extension 13, with annular cross-section, moves in a sealed manner, inside a small cross-section bore 15, arranged in the hydraulic transmitter portion 3 with a second O-ring 16 maintained in place by a rigid ring 17 at the outlet of the small cross-section bore 15, and which faces into a large annular hydraulic chamber 18. The large hydraulic chamber 18 is defined inside bore 7 by the large annular piston 8. Piston extension 13 provides, for the supply of a small hydraulic chamber 19 formed inside the small cross-section bore 15, first and second linking passages 20,21 with the large hydraulic chamber 18. In the reverse or right-hand-most position of the small hydraulic piston 14 (as shown in FIG. 1), the second passage 21 opens inside the small hydraulic chamber 19 in relation to a lipped third O-ring 22 of the small hydraulic piston 14. The first linking passage 20 opens up, on the other hand, on the side opposite the small hydraulic chamber 19, in relation to the third O-ring 22, in order to permanently lubrify the flange portion of the third O-ring 22, and especially to lubrify an intake bore 23 of the piston rod 24, formed as a portion of the pneumatic piston 2. This piston rod 24, whose end supports, by a ring 25, the third O-ring 22 of the small hydraulic piston 14, crosses intake bore 23 in a sealed manner because of a fourth O-ring 26. The pneumatic piston 2, and therefore the piston rod 24 and the small hydraulic piston 14 which are linked to it, are permanently returned toward the right side of the Figure by a first return spring 27 supported on the large hydraulic piston 8, and by a second return spring 28 supported on the intermediate housing portion 5. As can be seen in FIG. 1, the first return spring 27 exercises no return action on the pneumatic piston 2 when the small hydraulic piston 14 is supported by a rod collar 29, disposed on an opposing adjacent bottom lip portion 30 of a small bore 31 formed inside the piston extension 13. The first return spring 27 acts as a prestressed spring likely to transmit the prestressed force to the large hydraulic piston 8 when the pneumatic piston 2 moves towards the left (as shown in FIG. 1).

A delivery chamber 32 is arranged parallel to the small hydraulic chamber 19, inside the hydraulic housing portion 3, and is separated, by a ball valve 35, from the large hydraulic chamber 18; and finally by a delivery opening 38 with the receiving mechanism (not shown) to be supplied with the fluid under hydraulic pressure from the hydraulic pressure transmitter.

The operation of the hydraulic pressure transmitter, which has just been described in relation to FIG. 1, is now going to be described an application of activation of the receiving mechanism composed of a braking hydraulic cylinder which ensures, for example, the application of friction linings on friction tracks of a brake disc. In the position shown in FIG. 1, the receiving mechanisms are linked to the hydraulic fluid supply normally maintained at atmospheric pressure. When the receiving mechanisms are brake cylinders, which is the most frequent case, the brakes are maintained in a disengaged position in that manner.

To activate the hydraulic pressure transmitter, pneumatic pressure is introduced to the pneumatic control cylinder 1 by connection (which is not shown) and immediately pushes the pneumatic piston 2 towards the left (as shown in FIG. 1). The small hydraulic piston 14, which is formed integrally with the piston rod 24, moves towards the left as well, and causes separation of the rod collar 29 from the bottom lip portion formed in the small bore 31. A pneumatic piston 2, piston rod 24 assembly overcomes the stress of the first return spring 27 and could, therefore, act on the large hydraulic piston 8 to push it towards the left, which thus also effects the closing of the first check valve 11 by way of the large lip portion 8a contacting a valve pin 11a of the first check valve 11. The start of movement of the large hydraulic piston 8 takes place as soon as the rod collar 29 stops being in contact with the bottom lip portion 30 of the small bore 31 (which is formed in the piston extension 13) and before the exterior lip of the third O-ring 22 (disposed on the small hydraulic piston 14) blocks communication through the second linking passage 21 to the large hydraulic chamber 18. The advance of the large hydraulic piston 8 can cause delivery of hydraulic fluid through the second linking passage 21, from the large hydraulic chamber 18, towards the small hydraulic chamber 19, and via a small delivery passage 36, through the delivery opening 38, and thereafter, towards the receiving mechanism (not shown). In fact, the delivery of hydraulic fluid from the large hydraulic chamber 18 takes place mainly through a large delivery passage 37, by opening the ball valve 35, which can be substituted by a check valve having an elastomer sealed lining (the ball solution being chosen here only for reasons of compactness and not for efficiency of the no-return/check function). It should also be noted that the sections of the small and large delivery passages 36 and 37 are preferably chosen in such a way that, at equal translation velocity of the large and small hydraulic pistons 8 and 14, respectively (which is the case of the start of the movement of the pneumatic piston 2 towards the left), the loss of load, i. e., the drop in pressure through the small delivery passage 36, will be greater than that through the large delivery passage 37. This disposition thus ensures preferential delivery through the large delivery passage 37, in spite of the loss of load caused by the ball valve 35, which remains at an opening level such that, a sufficient loss of load exists at the crossing of the annular passage between the ball valve 35 and its seat 35a to permit pushing of a calibrated valve spring 34.

The delivery of a large flow of hydraulic fluid coming from the large hydraulic chamber 18 via the large delivery passage 37 and the open ball valve 35, as well as a small flow of hydraulic fluid which passes (in transit) via the second linking passage 21 and small delivery passage 36, rapidly pushes, by the intermediary of a receiving mechanism piston, the friction linings. Upon contact of the braking tracks of the braking discs against the return springs of these linings the pressure increases. Delivery of hydraulic fluid then ceases and the pressure in the large hydraulic chamber 18 increases to such a point that the advance of the large hydraulic piston 18 due to reaction stress of the first return spring 27, which is less than the pressure stress of the large hydraulic piston 18, stop. The small hydraulic piston 14 can then advance towards the left inside the piston extension 13, which is immobilized, to block the second linking passage 21 and reduce the volume of the small hydraulic chamber 19 thereby causing the pressure which exists in the small hydraulic chamber 19 to increase considerably, and apply the friction linings firmly in contact with the friction tracks of the discs. The displacement of the small hydraulic piston 14, towards the left stops when the hydraulic pressure which exists in the small hydraulic chamber 19(increased by friction reactions) balances the pneumatic pressure acting on the pneumatic piston 2. It should be noted that the pressure which exists in the small hydraulic chamber 19 also acts on the annular section of the piston extension 13, which normally remains immobilized by the friction reaction exercised on this piston extension 13 by the second O-ring 16 and by the third O-ring 22 of the small hydraulic piston 14. Any large increase of pneumatic pressure acting on the pneumatic piston 2 is thereafter translated by a new displacement of the small hydraulic piston 14 towards the left, as a result of additional compression of hydraulic fluid volume and of its enclosure walls, the elastomer sealed joints and friction linings included. When pneumatic pressure, which is acting on the pneumatic piston 2, decreases significantly, the small hydraulic piston 14 moves towards the right of the Figure as a result of reaction of hydraulic pressure. This displacement of the small hydraulic piston 14 generally produces displacement towards the right of the piston extension 13 as a result of the inversion of the friction reaction of the third O-ring 22 acting on it. The piston extension 13 therefore tends to accompany the small hydraulic piston 14, during its reverse movement towards the right, under the action of pressure exerted on the annular wall section of the piston extension 13 against the friction reaction of the second O-ring 16. When the pressure acting on the pneumatic piston 2 is removed, to thus effect disengagement of the brakes, the pneumatic piston 2 returns to the position shown in FIG. 1; and also carries along therewith, the small hydraulic piston 14, under the combined action of the reaction of the first and second return springs 27 and 28, and of the pressure existing in the small hydraulic chamber 19. The reaction of the first return spring 27 stops when the rod collar 29 comes to a stop at the bottom of the lip portion 30 of the small bore 31. From this moment, the second return spring 28 associated with the pneumatic piston 2, returns the piston rod 24 and the large hydraulic piston 8 towards the right while the second linking passage 21 was uncovered, thus also allowing the return of the hydraulic fluid (brought to the small hydraulic chamber) to the large hydraulic chamber 18. The return of the large hydraulic piston 8 continues as far as the position shown in FIG. 2 and thus opens the first check valve 11 by contact of the valve stem 11a with an edge collar 9, formed on the large hydraulic piston 8. The first check valve 11, in this manner, allows the hydraulic fluid coming from the tank (not shown) to compensate, if the case arises, for the fluid used in the receiving mechanism (not shown) as a result of a leak or wear of the friction linings. It should be observed that during a momentary disengaging of the brakes, for example, during a disengaging operation consecutive to a locking or tendency to locking of the brake wheels, i. e., an antiskid operation; the reverse of the pneumatic piston 2 causes only a partial reverse of the small hydraulic piston 14 accompanied, if the case arises, by the piston extension 13 which is formed integral with the large hydraulic piston 8. However, this reverse is sufficient to disengage the braking operation without causing the separation of the friction linings from the friction tracks, as a very slight reverse of the hydraulic fluid is sufficient to cause pressure to all in the hydraulic circuit.

The hydraulic pressure transmitter (shown in FIG. 2) consists of elements functionally identical to those in FIG. 1, and accordingly the same reference numerals have been assigned.

The large hydraulic piston 8 is integrally formed with a movable guide body 39, inside which is fitted (in a sealed manner) with a support sleeve 40, and a plunger piston 41. The plunger piston 41, having a reduced-thickness end 42, terminates in a projected extension 43, which has a stop disc 44 disposed thereon and which is susceptible to come up against an annular shoulder stop 45 put inside the guide body 39. The first return spring 27 is thus encased and prestressed between the pneumatic piston 2 (not shown here) and the large hydraulic piston 8, which moves about in a sealed manner, due to one or several fixed or movable first O-rings 7a in the hydraulic bore 7.

Figure 2:
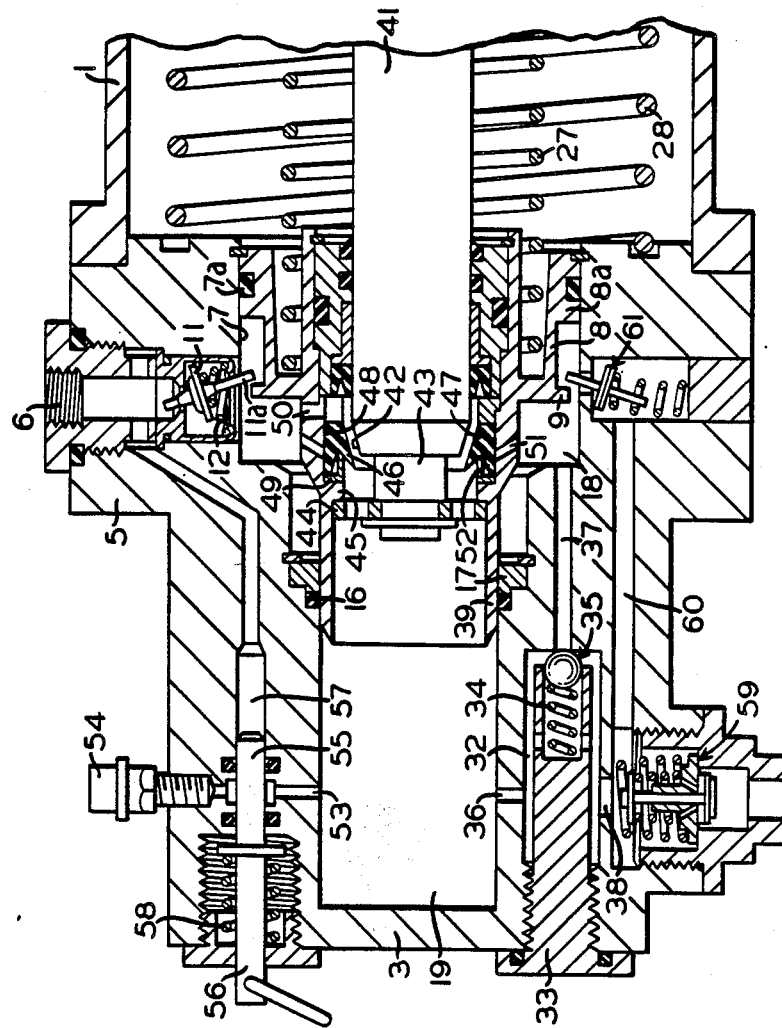
FIG. 2 is a longitudinal view, in section, of an alternate embodiment of the hydraulic pressure transmitter (constructed in accordance with the invention) wherein the small annular piston consists of a plunger piston.

According to a particular disposition, in the extreme reverse position of the plunger piston 41 (as shown in FIG. 2), the reduced-thickness end 42 is placed at a distance from an interior lip 46 of a lipped O-ring 47 housed in a seal bore 48, formed on the movable guide body 39 and maintained in place by a stop ring 49, supported on the bottom of this seal bore 48. In this position of extreme reverse, a supply passage 50 links the large hydraulic chamber 18 with the small hydraulic chamber 19. A fifth passage 51, extending through the wall of the guide body 39, opens up, however, onto an exterior lip 52 of the lipped O-ring 47 in order to allow this lip to play the role of a resupply check valve in the hypothesis where the small hydraulic chamber 19 would have pressure lower than that existing in the large hydraulic chamber 18.

It should be understood that the exterior cylindrical surface of the plunger piston 41, corrected with a mirror polish, will apply itself against the interior lip 46 of the lipped O-ring 47, to provide a sliding leak-proofness of very high quality and able to withstand very elevated overpressures (over 100 bar) which may exist in the small hydraulic chamber 19. A sixth passage 53, plugged by a fluid screw 54, extends from the top of the small hydraulic chamber 19. On this sixth fluid passage 53, a slide valve 55 is placed, which can be controlled by a spring knob 56, to manually link (in case of need) the small hydraulic chamber 19 to the hydraulic connection 6 via a discharge line 57. By releasing the spring knob 56, a valve return spring 58 returns the slide valve 55 to a sealed, closed position (as shown in the Figure).

A residual pressure valve 59 is screwed onto the delivery opening 38 in order to maintain a slight overpressure in the receiving mechanisms (not shown) and to ensure, in a rest position, the placement of the seals of the receiving mechanism to their rest positions. According to a very important characteristic of the method of implementation in FIG. 2, an overcharge passage 60 links, parallel to the large delivery passage 37, the delivery chamber 32, upstream of the residual pressure valve 59 to the large hydraulic chamber 18. A second check valve 61, opening up in the direction of the delivery chamber 32 and of the receiving mechanisms (not shown), is placed at the delivery of the large hydraulic chamber 18 in the overcharge passage 60 and this valve is brought to its open position by contact of the edge collar 9 formed on the large hydraulic piston 8, in the reverse position of the latter (as shown in FIG. 2). The operation of this hydraulic pressure transmitter (shown in FIG. 2) is deduced from that already explained in regard to FIG. 1. As soon as plunger piston 41 moves towards the left of the Figure, the reaction stress of the first return spring 27 is exercised on the large hydraulic piston 8 which moves towards the left, clearing the first and second check valves 11 and 61, which close thereby. The delivery of hydraulic fluid, such as that of oil, contained in the large hydraulic chamber 18, takes place through the supply passage 15 (which remained partially opened towards the small hydraulic chamber 19) but mainly via the larger delivery and overcharge passages 37 and 60 via the ball valve 35 and the second check valve 61 open to supply through residual pressure valve 59, and the receiver mechanisms (not shown) with a large flow of hydraulic fluid, and to ensure (as previously explained) the application of the brake linings on the brake tracks.

As soon as the delivery counterpressure, which exists in the large hydraulic chamber 18, balances the reaction of the first return spring 27, the displacement of the large hydraulic piston 8 towards the left,-stops; and the plunger piston 41 then continues alone to displace itself towards the left in relation to the guide body 39. The reduced-thickness end 42, then the exterior cylindrical surface of the plunger piston 41 come into contact with the interior lip 46 of the lipped O-ring 47, to close the small hydraulic chamber 19, in which the actual rise in pressure for braking is consecutive to the plunging of the plunger piston 41.

During disengaging of the brakes, the action exercised on the plunger piston 41, stops; and the return of the latter towards the right (as shown in the Figure) takes place, first alone; then when the stop disc 44 is in contact with the annular shoulder stop 45, the supply passage 50 is open, to link the large and small hydraulic chambers 18 and 19, and the large annular piston 8 is returned towards the right to finally open the first and second check valves 11 and 61 by the edge collar 9.

It should be noted that, in the disposition in FIG. 2, the guide body 39 can be shorter than that shown in FIG. 1, because it does not have a leak-proof bore from the small diameter piston. However, the large delivery passage 37 in the ball valve 35 can be eliminated, and the plunger piston 41 can be permanently engaged on the interior lip 46 of the lipped O-ring 47, because final putting in communication of the large and small hydraulic chambers 18 and 19 takes place via the second check valve 61, opened by the edge collar 9, in the return position of the large hydraulic piston 8. This simplification, which allows removal of the supply passage 50 (passage 51 being possibly kept to avoid a possible reduced pressure in the small hydraulic chamber 19 makes it possible to greatly improve the reliability of the high pressure system of the master cylinder according to the invention. The purging problems, which might exist in this simplified disposition/arrangement can be resolved by arranging the hydraulic body portion 3 in such a way that the plunger piston 41 is vertical; and in implementing the purge of the small and large hydraulic chambers 19 and 18 in their high part, the zone adjacent to the O-rings 47 will then be in the low part. The arrangements which favor the hydraulic circuit purge are very diverse, and are to be considered as part of the area accessible to the person experienced in the field.

The present invention, of course, is not limited to the methods of implementation described and shown, but it is open to numerous variations accessible to the person experienced in the field, without deviating from the scope of the invention.

Having thus described the invention, what we claim as new and desire to secure by Letters Patent, is:

1. A dual-piston hydraulic pressure transmitter for use with a brake actuator, comprising:
    (a) a first actuation member movable under the influence of fluid pressure to achieve a brake-applying operation upon movement in a first direction and a brake-releasing operation upon movement in a second direction, said first actuation member having a rod portion extending therefrom;
    (b) a first hydraulic piston connected to said rod portion and movable within a first hydraulic chamber such that, braking fluid is communicated through a first delivery passage to the brake actuator in response to such movement of said first actuation member;
    (c) a second hydraulic piston elastically connected to said first actuation member and movable within a second hydraulic chamber such that, braking fluid is communicated through a second delivery passage to the brake actuator in response to such movement of said first actuation member, said second delivery passage being larger in cross-sectional area than said first delivery passage;
    (d) elastic transmission means disposed between said first actuation member and said second hydraulic piston for transmitting forces between said first actuation member and said second hydraulic piston in an elastic manner such that, said first hydraulic piston can move independent of said second hydraulic piston;
    (e) a first check valve disposed in said second delivery passage and oriented such that, such braking fluid flows through said second delivery passage only in a direction from said second hydraulic chamber to the brake actuator;

(f) fluid communication means disposed between said first hydraulic chamber and said second hydraulic chamber and being effective, during at least a portion of such brake-applying operation, for communicating a portion of such braking fluid from said second hydraulic chamber to said first hydraulic chamber and, during at least a portion of such brake-releasing operation, for returning a second portion of such braking fluid from said first hydraulic chamber to said second hydraulic chamber; and (g) fluid-reducing means cooperatively engaging said second hydraulic piston for reducing the level of such braking fluid in said second hydraulic chamber to a preselected amount upon movement of said second hydraulic piston to a predetermined position during such brake-releasing operation.

2. A dual-piston hydraulic pressure transmitter, as set forth in claim 1, wherein said elastic transmission means includes a first return spring in contact, at one end, with said first actuation member and in contact, at the other end, with said second hydraulic piston, and further, includes a second return spring fixed on one end in a stationary manner and is in contact with, at the other end, said first actuation member such that, said first actuation member can be returned in such second direction to a brake-release position upon removal of such fluid pressure from influence on said first actuation member.

3. A dual-piston hydraulic pressure transmitter, as set forth in claim 2, further comprising a piston return means disposed between said first and second hydraulic pistons for transmitting the spring force associated with said second return spring through said first hydraulic piston such that, said second hydraulic piston is returned in such second direction following removal of such fluid pressure from influence on said first actuation member, said piston return means including a stop portion extending radially outward from a portion of said first hydraulic piston and a collar portion extending radially inward from a portion of said second hydraulic piston in complementary relation to said stop portion.

4. A dual-piston hydraulic pressure transmitter, as set forth in claim 1, further comprising an overcharge passageway extending, at one end, from a pressure outlet disposed downstream from said first and second delivery passages and at the other end, to a second check valve disposed adjacent said second hydraulic chamber and oriented such that, in an open condition, braking fluid can flow from the brake actuator to said second hydraulic chamber.

5. A dual-piston hydraulic pressure transmitter, as set forth in claim 4, wherein said second check valve includes a second valve stem extending towards said second hydraulic piston such that, upon movement of said second hydraulic piston in such second direction to a brake-release position, a piston lip, formed on said second hydraulic piston, contacts said second valve stem and effects opening of said second check valve thereby.

6. A dual-piston hydraulic pressure transmitter, as set forth in claim 5, further comprising a resupply valve disposed adjacent said second hydraulic chamber and oriented such that, such braking fluid can flow into said second hydraulic chamber at essentially atmospheric pressure when said resupply valve is in a first open condition and such braking fluid can flow out of said second hydraulic chamber at a pressure level substantially higher than atmospheric pressure when said resupply valve is in a second open position effected by movement of said first hydraulic piston in such second direction as corresponds to a brake-release condition.

7. A dual-piston hydraulic pressure transmitter, as set forth in claim 5, further comprising a residual pressure valve disposed between the brake actuator and said overcharge passageway and oriented such that, in the event of a pressure level in the brake actuator above a predetermined level, said residual pressure valve opens and an amount of such braking fluid can flow therethrough.

8. A dual-piston hydraulic pressure transmitter, as set forth in claim 1, further comprising a tubular piston extension formed coaxially on said second hydraulic piston, said piston extension extending into at least a portion of said first hydraulic chamber in surrounding-relation to said first hydraulic piston such that said first hydraulic piston is guided therewithin.

9. A dual-piston hydraulic pressure transmitter, as set forth in claim 6, wherein a surface area of said tubular piston extension, residing within said first hydraulic chamber, is subjected to such braking fluid pressure therein, said piston extension surface area being substantially smaller in dimension than the surface area of said first hydraulic piston such that, said first hydraulic piston is affected to a substantially greater degree by the pressure.

10. A dual-piston hydraulic pressure transmitter, as set forth in claim 8, wherein said fluid communication means includes a second linking passage formed in said piston extension such that said first hydraulic chamber is, at times, put in fluid communication with said second hydraulic chamber.

11. A dual-piston hydraulic pressure transmitter, as set forth in claim 8, further comprising a first linking passage formed in said tubular piston extension such that, such braking fluid can be channelled into contact with an annular seal disposed around said first hydraulic piston.

12. A dual-piston hydraulic pressure transmitter, as set forth in claim 8, wherein said first hydraulic piston is a plunger-type piston formed integrally on said rod portion and having a tapered portion formed on a first end extending into said first hydraulic chamber, said first hydraulic piston further having a stop portion formed on said first end which, when said first hydraulic piston is moving in such second direction, contacts a lip portion formed inside said piston extension such that said second hydraulic piston can be moved in such second direction along with said first hydraulic piston.

13. A dual-piston hydraulic pressure transmitter, as set forth in claim 12, wherein said tapered portion of said first hydraulic piston contacts a first interior lip of a V-shaped seal disposed in said piston extension to seal said first hydraulic chamber from said second hydraulic chamber when said tapered portion has extended through said piston extension beyond the point where said V-shaped seal is disposed.

14. A dual-piston hydraulic pressure transmitter, as set forth in claim 13, wherein said V-shaped seal further includes a second, exterior lip portion which closes an auxiliary supply passage formed in said piston extension to channel additional brake fluid between said first and second hydraulic pressure chambers when necessary.

15. A dual-piston hydraulic pressure transmitter, as set forth in claim 8, wherein said first delivery passage leading from said first hydraulic chamber to the brake actuator is a throttled opening to restrict the flow of such braking fluid therethrough.

16. A dual-piston hydraulic pressure transmitter, as set forth in claim 8, wherein said first actuation member is a pneumatic piston movable within a pneumatic chamber under the influence of fluid pressure introduced thereto.

17. A dual-piston hydraulic pressure transmitter, as set forth in claim 8, wherein said piston extension blocks communication between said first and second hydraulic chambers following a completed movement of said second hydraulic piston and continued movement by said first hydraulic piston in such first direction.

18. A dual-piston hydraulic pressure transmitter, as set forth in claim 8, wherein said elastic transmission means includes a first return spring in contact, at one end, with said first actuation member and in contact, at the other end, with said second hydraulic piston, and further, includes a second return spring fixed on one end in a stationary manner and is in contact with, at the other end, said first actuation member such that, said first actuation member can be returned in such second direction to a brake-release position upon removal of such fluid pressure from influence on said first actuation member.

19. A dual-piston hydraulic pressure transmitter, as set forth in claim 1, further comprising a manually operable slide valve operably connected to said first hydraulic chamber such that, braking fluid can be selectively channelled therefrom.

* * * * *